(12) United States Patent
    Chang et al.

(10) Patent No.: US 9,037,672 B2
(45) Date of Patent: May 19, 2015

(54) NON-VOLATILE MEMORY PHYSICAL NETWORKS

(75) Inventors: Jichuan Chang, Sunnyvalle, CA (US); Parthasarathy Ranganathan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 13/524,659

(22) Filed: Jun. 15, 2012

(65) Prior Publication Data

US 2013/0339468 A1    Dec. 19, 2013

(51) Int. Cl.
    *G06F 15/167* (2006.01)
    *G06F 13/00* (2006.01)
    *G11B 15/18* (2006.01)
    *G11B 17/00* (2006.01)
    *G11B 19/02* (2006.01)
    *G06F 17/30* (2006.01)

(52) U.S. Cl.
    CPC *G06F 17/30* (2013.01); *Y02B 60/50* (2013.01)

(58) Field of Classification Search
    CPC ........................................................ B65G 1/00
    USPC ........................................................ 709/213
    See application file for complete search history.

(56) References Cited

U.S. PATENT DOCUMENTS

| 6,684,564 | B1* | 2/2004 | Hirahara ........................ 47/57.6 |
| 7,082,497 | B2* | 7/2006 | Slater et al. .................... 711/114 |
| 7,103,731 | B2 | 9/2006 | Gibble et al. |
| 7,143,256 | B2 | 11/2006 | Maciel |
| 7,659,820 | B2* | 2/2010 | Schnee et al. ............ 340/572.1 |
| 7,913,042 | B2 | 3/2011 | Ogihara et al. |
| 2006/0007576 | A1* | 1/2006 | Georgis ........................ 360/69 |

OTHER PUBLICATIONS

Data Imports and Exports for Rackspace Archiving, (Web Page), http://www.rackspace.com/apps/support/node/1196.

* cited by examiner

*Primary Examiner* — Kevin Bates
*Assistant Examiner* — Emad Siddiqi
(74) *Attorney, Agent, or Firm* — Van Cott, Bagley, Cornwall & McCarthy (57) ABSTRACT

A method for communication between computing devices includes identifying the parameters of a data transfer between a source computing device and a target computing device and identifying communication paths between a source computing device and target computing device, in which at least one of the communications paths is a physical network. A communication path is selected for the data transfer. When a data transfer over the physical network is selected as a communication path, a nonvolatile memory (NVM) unit is removed from the source computing device and placed in a cartridge and the cartridge is programmed with transfer information. The NVM unit and cartridge are transported through the physical network to the target computing device according to the transfer information and the NVM unit is electrically connected to the target computing device.

20 Claims, 5 Drawing Sheets

NON-VOLATILE MEMORY PHYSICAL NETWORKS

BACKGROUND

In computing systems, data is often transferred from one computing device to another. These data transfers can serve a variety of purposes, including submitting and responding to queries, obtaining desired information, distribution of computing tasks, data back up and other purposes. In many situations, larger and larger quantities of data are being transferred between computing devices and the time and energy required to transfer data becomes a limiting factor in the performance and energy consumption of the computer system.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

In many computing systems the performance, capacity or energy efficiency of the entire system is constrained by a limited number of components or resources. These limiting components or resources are called "bottlenecks." For optimal operation of computing systems, bottlenecks within the system should be eliminated or mitigated. In the past, rotating disk based storage bandwidth and power efficiency have been primary bottlenecks in computing systems. Emerging Non-Volatile Memory (NVM) technologies such as Phase-Change Memory (PCM), spin transfer torque random access memory (STT-RAM) and memristors offer high-bandwidth persistent memory and data storage. The use of NVM technology will produce at least an order of magnitude improvement in energy efficiency and communication bandwidth from the NVM memory in the computing systems. This eliminates the current bottleneck in computing systems resulting from the use of rotating disk-based storage.

In systems that use NVM memory, one bottleneck will be the bandwidth and energy efficiency of the communication network used to transfer data between computing devices. An electronic high-speed network is expensive, both in capital and operational costs. The components of a electronic high-speed network include wiring, high-bandwidth network interface cards, links, and switches/routers. Electronic networks may include technologies that transmit data using electrical impulses and/or optical signals. Conventional data-center networks are hard to scale up because the transmission is constrained by the bandwidth of wires and costs of core switches. The wired communication networks are often the least energy efficient sub-systems in a computing system. For example, a significant amount of power is consumed for TCP/IP processing, by network interface controllers, and by network routers and switches. Some amount of energy efficiency can be gained by under-provisioning the communication network to reduce the number of components drawing power. This can significantly reduce the available bandwidth of the communication network and reduce its performance during times of high demand. However, even with today's network that sacrifices bandwidth by an oversubscription ratio of 4 to 10, communication networks still contribute significantly (by 15% or more) to data center total cost of ownership (TCO).

Creation of a high-speed low-power communication network within data centers using NVM technology can regain the balance between computing, data storage and data communication. The principles below address this communication bottleneck, not by moving bits between storage devices in separate servers, but by moving the storage media or devices themselves between servers, to improve performance and reduce power. Due to the persistence of data in the NVM units, they can be disconnected and reconnected between servers without losing data. Such networks that physically move storage media or devices across compute nodes are hence called "physical networks." Cartridges equipped with RFID or wireless can be used as both hosting vehicles as well as naming/routing entities (like packets in a digital network) on top of a physical network (e.g., a pulley-based conveyer belt between servers). The use of a physical network can increase data transfer rates between the computing devices in the data center and lower the amount of energy used to make the data transfer.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
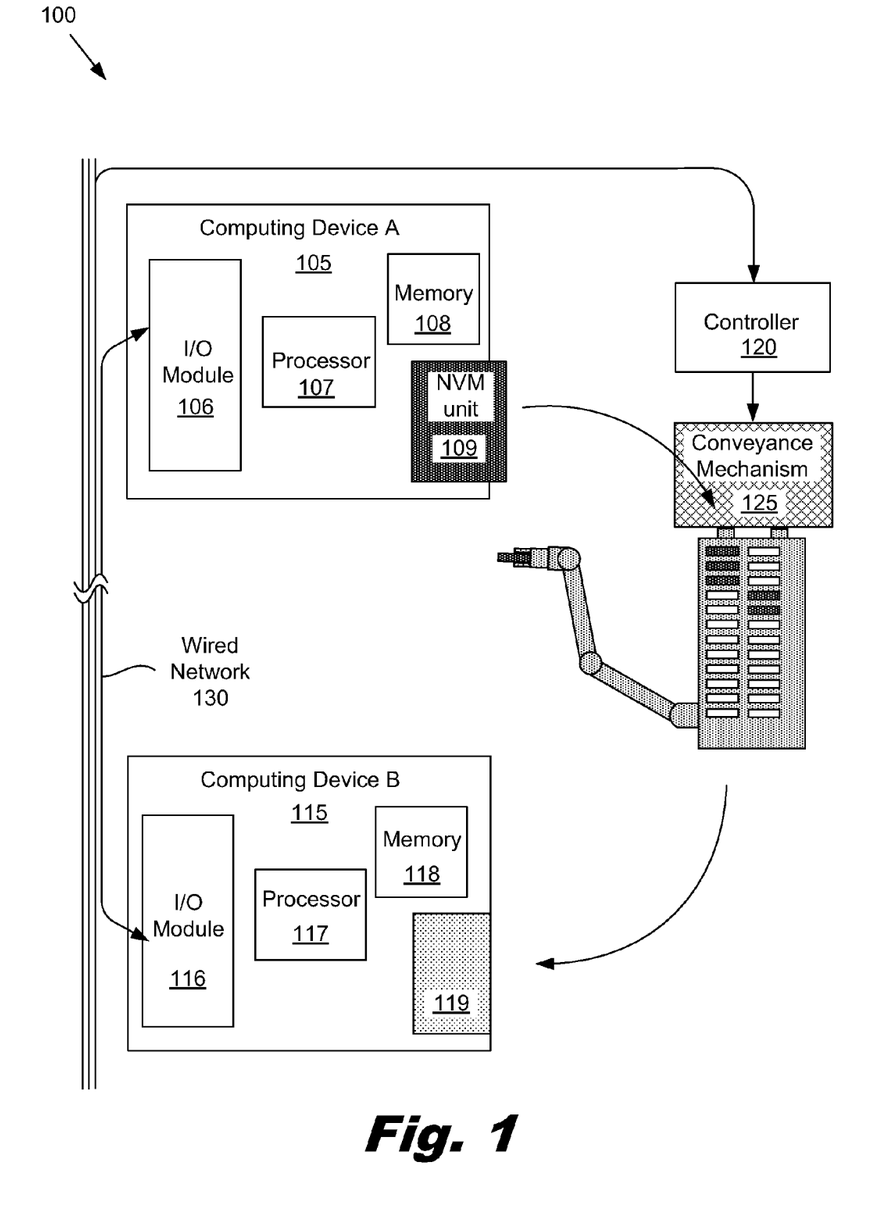
FIG. 1 is a diagram of a computing system that includes a non-volatile memory physical network, according to one example of principles described herein.

FIG. 1 is a diagram of a computing system (100) that includes at least two computing devices (105, 115). The computing devices (105, 115) each include a processor (107, 117), a memory (108, 118) and an input/output module (106, 116). The processors (107, 117) may contain one or more processing cores, co-processors, or other processing elements. The memory (108, 118) may be volatile memory, nonvolatile memory, or a combination of volatile or nonvolatile memory. The I/O module may perform a variety of functions including TCP/IP functions.

Additionally, the computing devices (105, 115) may include a receptacle (119) designed to receive one or more NVM modules (109). The first computing device (105) has a NVM unit (109) plugged into its receptacle. The second computing device (115) has an empty receptacle (109).

To perform various desired operations, the two computing devices (105, 115) may need to communicate. For example, computing device A (105) may be instructed to transfer a database to computing device B (115). Computing device A is the "source computing device" and computing device B is the "target computing device." In this example, there are two paths through which the two computing devices can communicate. The first path is through a electrically-wired network (130). To transfer data on the wired network (130), the processor (107) retrieves data from its memory (108), processes it, and then outputs the data to the I/O module (106). The I/O module then places small portions of the data on the wired network and waits until computing device B (115) has received these portions before placing the next portion of the wired network. The data on the wired network may pass through a number of additional routers, switches, and links that are not illustrated. Depending on the topology of the wired network, the data may travel a path that is far greater than the actual physical distance between two computing devices.

Additionally or alternatively, the data may be transferred using a physical network that includes a controller and a conveyance mechanism. To make a data transfer using the physical network, the data is loaded onto the NVM unit. In some embodiments, the data may already reside on the NVM unit. The controller instructs the conveyance mechanism to remove the NVM unit from the first computing device, place the NVM in a cartridge, move the cartridge to computing device B, and then load the NVM unit into the receptacle of computing device B.

In some circumstances, transferring data using the physical network can be more time and energy effective than transferring data over the wired network. For example, assume that each computing device has 16 NVM units, each with one terabyte of capacity. Each of the NVM units is half full. Thus the first computing device is storing a total of about 8000 gigabytes of data in the NVM units. Further assume that the computing devices are connected by a wired network capable of transferring 10 gigabytes of data per second and have 100 gigabytes per second of memory bandwidth to support the wired network transfer. To transfer the data over the wired network would take about 800 seconds, assuming that the full bandwidth of the wired network and memory were available.

In contrast, using a physical network to transfer the 16 NVM units may take as long as 80 seconds. The 80 seconds includes time for automated removal of the 16 NVM units from the source computing device, conveying the 16 NVM units to the target computing device, and inserting the 16 units into the target computing device. This is an order of magnitude faster than the wired transfer.

A similar calculation can be made with regard to the amount of energy required to move the data. Conservatively assume that the amount of power required to transfer 1 gigabyte of data over the wired network is 1 watt-hour. The total energy use to move 8000 gigabytes over the wired network would be 8 kilowatt hours. Assume the physical network can move each of the NVM units using 10 watt hours of energy, for a total of 160 watt hours or 0.16 kilowatt hours. This is a significant reduction in energy consumption.

Figure 2:
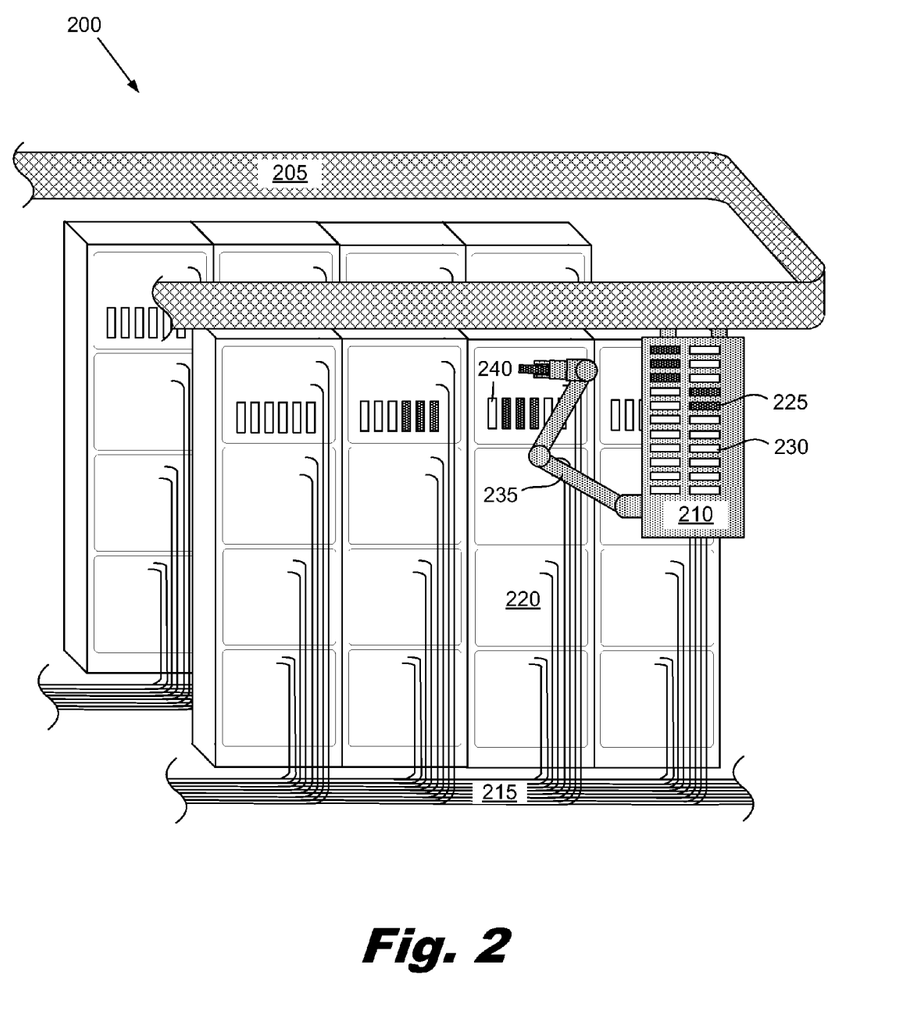
FIG. 2 is a perspective view of a computing system that includes a non-volatile memory physical network, according to one example of principles described herein.

FIG. 2 shows a number of server racks (220) in a data center (200) that are connected by both a wired network (215) and a physical network (205, 210, 235). In this example, the wired network (215) connects the various computing devices contained within the server racks (220). The wires pass through wire racks beneath the floor of the data center to form the desired connections and network topology.

In this example, the physical network includes an overhead rail (205) that passes between and along the rows of server racks (220). A trolley (210) is connected to the overhead rail (205). The trolley (210) includes apertures (230) that hold a number of NVM units (225) and a robotic arm (235) for extracting and inserting NVM units (225) from the servers and trolley apertures (230). Multiple trolleys/rails may be used to achieve the desired volume and transfer times within the physical system.

Figure 3:
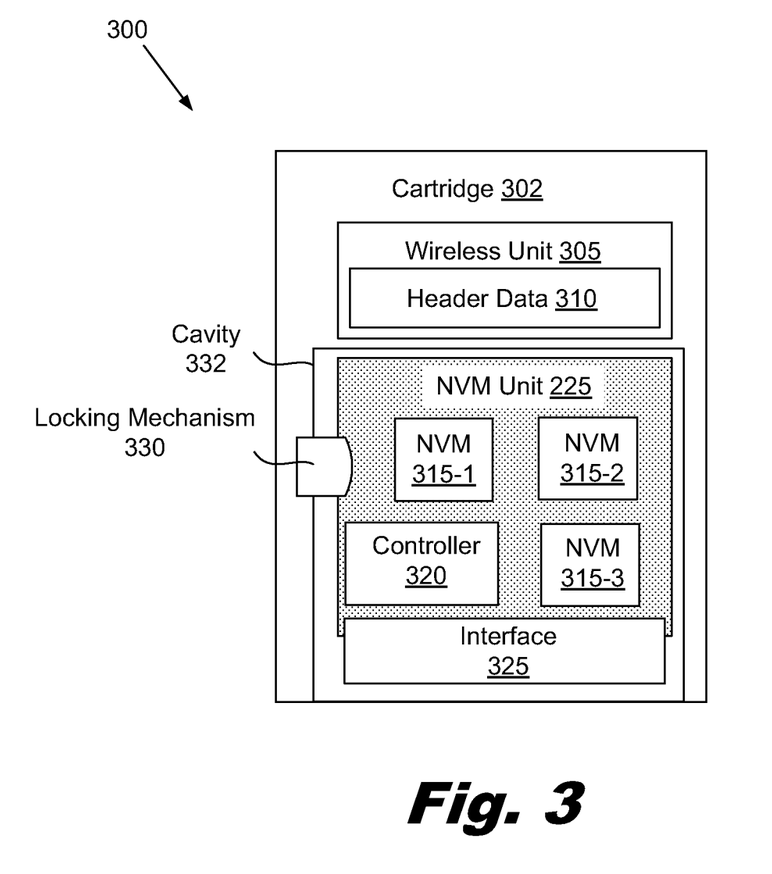
FIG. 3 is a diagram of a cartridge containing a nonvolatile memory unit, according to one example of principles described herein.

FIG. 3 is a diagram of an NVM assembly (300) that includes a cartridge (302) and an NVM unit (225) during transfer on the physical network. The cartridge in this example includes a wireless unit (305) that contains header data (310). The header data (310) may include meta-data that identifies the NVM unit and the data contained on the NVM unit, the source computing device, the destination computing device, routing information, encryption information, and other data. The wireless unit (305) can communicate the header data (310) to any number of devices, including robots manipulating the cartridge, the physical network controller, the servers, monitoring stations, mobile devices carried by monitoring personnel, or other devices. The information in the header allows the NVM unit to be identified, tracked, and correctly routed to the target computing device or library. In some examples, the wireless unit may be a radio frequency identification tag. In other embodiments, the wireless unit may be a Bluetooth® device, WiFi™ enabled device, or may communicate using microwave, radio, infrared, ultrasonic, optical or other technology. If required, the wireless unit may include a battery or other energy source.

Additionally or alternatively, the cartridge may include a capability for wired communication of the data in the header. For example, the cartridge may include conductive pads that can be contacted to communicate the header data. These pads could be contacted by the trolley, robot, and other devices that interact with the cartridge.

In this example, the cartridge (302) also includes an interior cavity (332) to receive the NVM unit (225) and a reversible locking mechanism (330) to lock the NVM unit (225) in place within the interior cavity. The reversible locking mechanism (330) may be a spring-loaded mechanism, an electrical actuator, or other releasable locking mechanisms.

In the implementation shown in FIG. 3, the NVM unit (225) includes a number of non-volatile memory chips (315) for storing data, a controller (320), and an interface (325). When inserted into a matching receptacle, the interface (325) makes a connection with the computing device and allows data to be transferred from the non-volatile memory chips (315) to the computing device under control of the controller (320). In some embodiments, the controller (320) may be a component of the computing device rather than an integrated part of the NVM unit (225).

Figure 4:
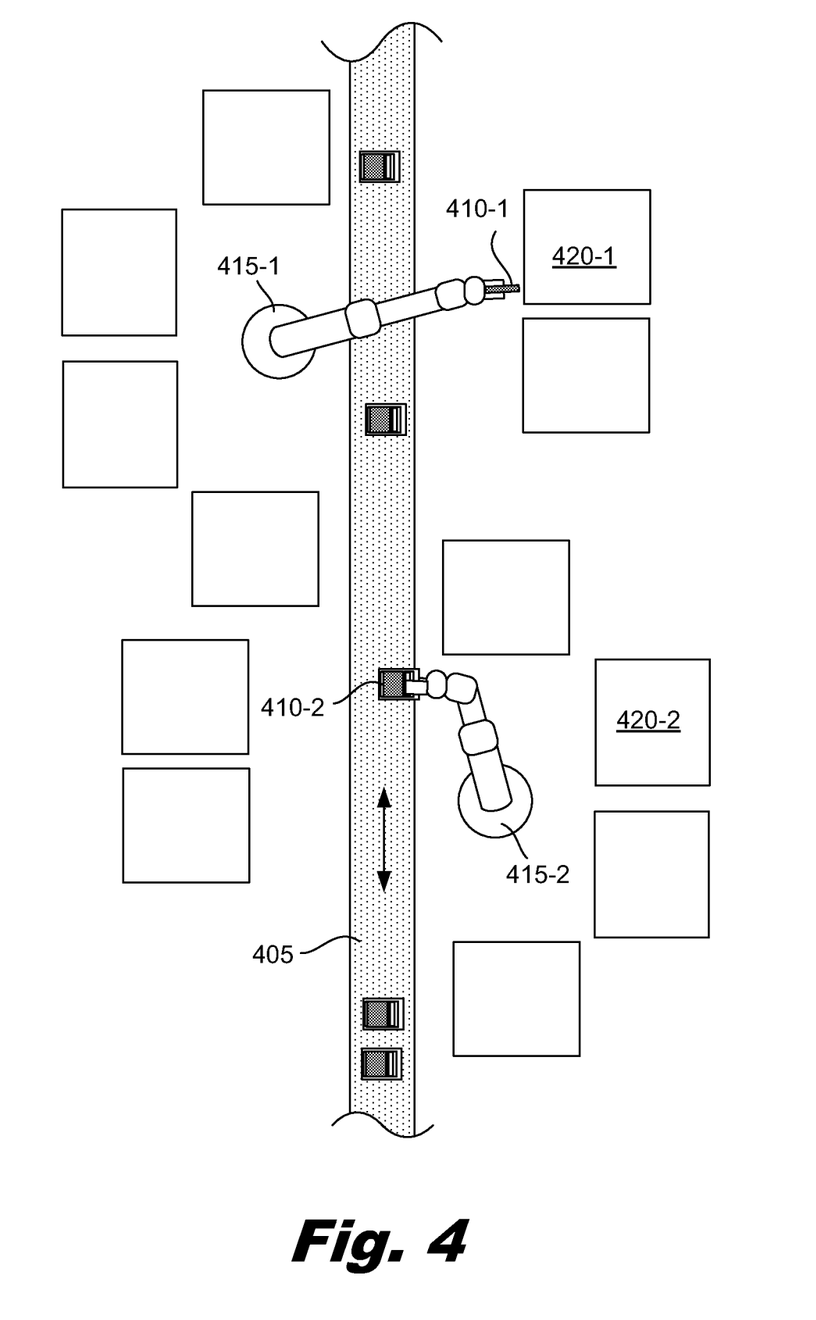
FIG. 4 is a plan view of a computing system that includes a non-volatile memory physical network, according to one example of principles described herein.

The systems and methods described above are only illustrative. A variety of approaches could be used to implement the principles described herein. FIG. 4 shows one example of a physical network in which robots (415) or other automated mechanisms for manipulation of the NVM units (410) are stationary and a conveyance system (405) such as a conveyor belt or pulley system moves the NVM units (410) between locations. The robots (415) are configured to both take NVM units from the conveyance system (405) and place the NVM units into the computing devices and to remove the NVM units from the computing devices and place the NVM units on the conveyance system. Each robot has a number of computing devices that it services. For example, a first robot (415-1) has picked a first NVM unit (420-1) off the conveyance system (405) and is inserting it into a first computing device (420-1). The first robot (415-1) can perform similar actions for other computing devices that are in proximity to it.

A second robot (415-2) has removed a second NVM unit (410-2) from a second computing device (420-2) and is placing it on the conveyance system (405). The second NVM unit (410-2) will then be transported to a desired destination that may be another computing device or data repository.

In some implementations, the robot removes the cartridge prior to inserting the NVM unit in the computing device. In other implementations, the action by the robot to insert the NVM unit into the computing device forces the NVM unit out of the cartridge and into the receptacle. The cartridge may be connected to the NVM unit in a variety of ways, including spring-loaded tabs, electrical actuators, or other releasable locking mechanisms. In other implementations, the cartridge may be a semi-permanently connected to the NVM unit and be inserted into the computing devices with NVM unit.

Figure 5:
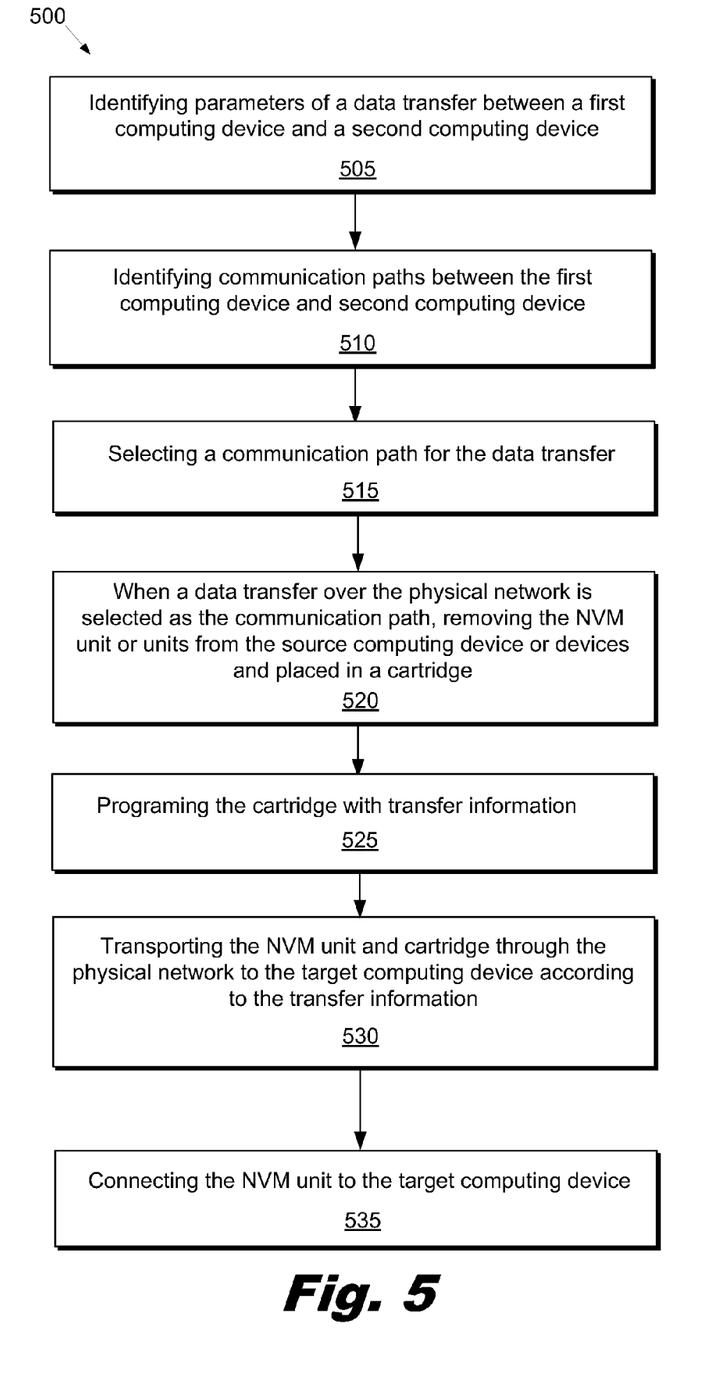
FIG. 5 is a flowchart of a method for transmitting data over a nonvolatile memory physical network, according to one example of principles described herein.

FIG. 5 is a flow chart that describes a method (500) for communication between computing devices. The method includes identifying relevant parameters of the data transfer between a first computing device and a second computing device (block 505). For example, the amount of data to be transferred, the time frame available to make the data transfer before other operations are impeded, security considerations, and other parameters could be identified.

Various communication paths between the source computing device and target computing device are identified (block 510). For example, a wired network, a physical network and a wireless network may exist between the two computing devices. The various characteristics of the available communication paths can also be obtained. These characteristics may include availability, reliability, communication speed, security, energy efficiency, and other considerations. For a physical network, the characteristics may include the state and/or location of the components of the physical network.

A communication path for the data transfer is selected (block 515). Selection of a "best" communication path allows the data to be transferred according to the desired parameters or as close as possible to the desired parameters. For example, if there is a small amount of data, it may be more time and energy efficient to transfer the data via a wireless or wired network. For data transfers to target computing devices that are long distances away from the source computing device, it may be most effective to use a wired network for the transfer. For large amounts of data being transferred between computing devices in close proximity, the data may be most effectively transferred using the physical network. For example, in recovering from a component failure or system disruption in a data center, large amounts of data may need to be transferred from failed computing devices to operating computing devices to restore the operation of the data center. Another scenario where bulk data transfers between computing devices occurs is during data backup. Using a physical network, the process of data back up may be as simple as replicating data from current working NVM to a local NVM storage, and then removing several NVM units from one computing device and placing them in another computing device.

In other circumstances, security may be an overriding concern. There can be a number of security advantages in making a physical transfer of data rather than a transfer of data through a wired connection. For example, it may not be desirable for a secure computing device to have a wireless or wired connection. Additionally, the use of physically removable NVM units allows the data to be separately secured.

The decision about which network should be used to transport the data can be accomplished in a number of ways including using an equation that weights each parameter involved in the transfer and then applies these weights to the performance/characteristics of the various available networks. Each network or communication path can then be scored and the network with the highest score can be selected for the transfer.

In some examples, it may be desirable for the data to be transferred through two or more networks. This may be done for time efficiency or for redundancy. For example, a data processing operation may involve the transfer of a large database and a rule set from a source computing device to a target computing device. The data processing operation is time sensitive and should be completed in the shortest time possible. The relatively small rule set and instructions for setting up the operation can be sent to the target computing device over the wired network while the database may be set via the physical network. Even though the wired network is relatively slow in comparison with the physical network in transferring large amounts of data, the wired network can quickly transfer the rule set and operation instructions to the target computer. The target computer can then begin setting up the operation and allocating memory for the database that will shortly be received via the physical network. By transferring the data in parallel, the data can be transferred more rapidly and efficiently.

When a data transfer over the physical network is selected as the communication path for at least some of the data, the NVM unit or units are removed from the source computing device or devices and placed in a cartridge (block 520). The cartridge can be programmed by writing the target computing device ID and routing/naming information that can be recognized by various routing devices and robots via cartridge emitted radio frequency or wireless signals. If the cartridge has capacity to contain multiple NVM units, the cartridge can be programmed together with the robots to stop at multiple servers to collect and dispense NVM units.

In some implementations, NVM units may be programmed to store bulk data for transfer. These NVM units store metadata such as file system identifiers and authentication information to ensure that the right data go to the correct servers. The physical network management system, led by the controller and assisted by other controllers as needed, collaborates with user programs to initiate, prepare and complete data transfers by properly programming the robots, cartridges, and severs. The physical network management system also monitors and controls the physical network to adjust speed, power consumption, and other parameters.

The NVM unit and cartridge are transported to the target computing device according to the transfer information (block 525). For example, the transportation to the target computing device may include removing the NVM unit from a source computing device by the robot and placing the NVM unit in the cartridge. The cartridge may be individual to a specific NVM unit or may be configured to hold many NVM units. One example of a cartridge that holds many NVM units could be the trolley (210, FIG. 2) shown in FIG. 2. The cartridge then moves from the source computing device to the target computing device (block 530) where a robot removes the NVM unit from the cartridge and places the NVM unit into a receptacle on the target computing device (block 535). The target computing device then has access to the data on the NVM unit.

The principles described above provide a high-speed, low-power automatic network for data centers and potentially across wider area networks. The physical network includes NVM units, cartridges, and a physical transport system. The use of a cartridge like device to store the NVM units and header information provides naming and routing support for individual NVM units. For example, the header information may include target node identification, NVM metadata and other information. NVM supports data persistency, high-speed when the device is connected to the target servers, and extra capacity for data staging. Examples of situations where a data transfer using a physical network may be particularly applicable include: bulk transfer (backup and index update), exchange (sort/shuffle), import/export (extract-transform-load) and recovery. For example, recovery using the physical network may be significantly faster than in-place reconstruction.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A network for data communication between computing devices comprising:
   a nonvolatile memory (NVM) unit;
   a cartridge to receive the NVM unit, the cartridge comprising a wireless transmitter and a memory to hold routing information;
   a conveyance system to transport the NVM unit and cartridge from a source computing device to a target computing device;
   a physical network controller to control the conveyance system to transport the NVM unit and cartridge from a source computing device to a target computing device according to the routing information;
   wherein the network is programmed for:
   identifying parameters of a data transfer between the source computing device and the target computing device;
   identifying communication paths between the source computing device and the target computing device, the communication paths comprised in the physical network;
   selecting a communication path for the data transfer;
   when a physical data transfer over the physical network is selected as a communication path for the data transfer, removing the nonvolatile memory (NVM) unit from the source computing device and placing the removed NVM unit in the cartridge;
   programming the cartridge with transfer information;
   transporting the NVM unit and cartridge through the physical network to the target computing device according to the transfer information;
   connecting the NVM unit into the target computing device; and
   in which selecting a communication path for the data transfer comprises:
   evaluating at least two different communication paths for data transfer between the source computing device and a target computing device; and
   determining when the physical data transfer is a most efficient communication path for the data transfer.

2. A physical network for data communication between computing devices comprising:
   a nonvolatile memory (NVM) unit;
   a cartridge to receive the NVM unit, the cartridge comprising a wireless transmitter and a memory to hold routing information;
   a conveyance system to disconnect the NVM at a source computing device, transport the NVM unit and cartridge from the source computing device to a target computing device and connect the NVM at the target computing device;
   a physical network controller to control the conveyance system to transport the NVM unit and cartridge from the source computing device to the target computing device according to the routing information; and
   a control unit for determining, based on parameters of a data transfer, whether a physical data transfer via the NVM unit as transported by the conveyance system or an electronic data transfer via an electronic data connection between the source and target computing devices is a most efficient communication path for the data transfer.

3. A physical network for data communication between computing devices comprising:
   a nonvolatile memory (NVM) unit;
   a cartridge to receive the NVM unit, the cartridge comprising a wireless transmitter and a memory to hold routing information;
   a conveyance system to transport the NVM unit and cartridge from a source computing device to a target computing device;
   a physical network controller to control the conveyance system to transport the NVM unit and cartridge from a source computing device to a target computing device according to the routing information.

4. A method for communication between computing devices on the physical network of claim 3, the method comprising:
   identifying parameters of a data transfer between the source computing device and the target computing device;
   identifying communication paths between the source computing device and the target computing device, the communication paths comprised in the physical network;
   selecting a communication path for the data transfer;
   when a data transfer over the physical network is selected as a communication path for the data transfer, removing the nonvolatile memory (NVM) unit from the source computing device and placing the removed NVM unit in the cartridge;
   programming the cartridge with transfer information;
   transporting the NVM unit and cartridge through the physical network to the target computing device according to the transfer information; and
   connecting the NVM unit into the target computing device.

5. The method of claim 4, in which the data transfer over the physical network comprises one of: a system back up, data staging, system restore, index update, or recovery after failure.

6. The method of claim 4, in which selecting a communication path for the data transfer comprises determining that an amount of time to make the data transfer over the physical network is less than an amount of time required to make the data transfer using an alternative method.

7. The method of claim 4, in which selecting a communication path for the data transfer comprises determining an amount of energy required to make the data transfer over the physical network is less than an amount of energy required to make a data transfer using an alternative method.

8. The method of claim 4, in which programming the cartridge with transfer information comprises:
   generating transfer information comprising at least one of: routing information, meta-data describing the data being transferred, cartridge information, authentication information, and target computer information; and
   storing the transfer information in the cartridge.

9. The method of claim 8, in which the cartridge comprises a communication capability for communicating the transfer information while the cartridge and NVM unit are being transported.

10. The method of claim 9, which the communication capability comprises one of: a wired communication capability and a wireless communication capability; in which the wireless communication capability comprises one of radio frequency or microwave data transmission.

11. The method of claim 4, in which transporting the nonvolatile memory unit through the physical network to the target computing device according to the transfer information comprises removing the NVM unit containing desired data from physical and electrical connection with the source computing device and automatically routing the NVM unit through the physical network to the target computing device.

12. The method of claim 4, in which physically transporting the NVM unit through the physical network to the target computing device according to the transfer information comprises receipt of the transfer information by a robot and manipulation of the NVM unit by the robot.

13. The physical network of claim 3, further comprising a robot to remove the NVM unit from the source computing device and place the NVM unit in the cartridge.

14. The physical network of claim 3, in which the conveyance system comprises:
a track;
trolley to travel on the track and to contain a plurality of NVM units; and
a robot attached to the trolley to remove one of the NVM units from the trolley and to place the NVM unit in electrical contact with the target computing device.

15. The physical network of claim 3, in which the conveyance system comprises:
a conveyor belt to transport the NVM unit and cartridge; and
a robot to remove the NVM unit and cartridge from the conveyor belt and electrically connect the NVM unit to the target device.

16. The physical network of claim 3, wherein said cartridge comprises:
an interior cavity to receive the NVM unit; and
a reversible locking mechanism to lock the NVM unit in place within the interior cavity, the reversible locking mechanism comprising one of a spring-loaded mechanism and an electrical actuator.

17. The physical network of claim 3, wherein the memory of the cartridge further comprises an identification of the NVM unit and data contained on the NVM unit.

18. The physical network of claim 3, wherein the NVM unit comprises a number of NVM chips for storing data, a controller and an interface.

19. The physical network of claim 3, further comprising a control unit for determining whether a particular data transfer is most quickly performed by the physical network or by a wired or wireless data network.

20. The physical network of claim 3, further comprising a control unit for determining whether a particular data transfer will consume less energy being made by the physical network or by a wired or wireless data network.

* * * * *